United States Patent
El-Shabani et al.

(10) Patent No.: US 11,119,787 B1
(45) Date of Patent: Sep. 14, 2021

(54) NON-INTRUSIVE HARDWARE PROFILING

(71) Applicant: Amazon Technologies, Inc., Seattle, WA (US)

(72) Inventors: Mohammad El-Shabani, Mountain View, CA (US); Ron Diamant, Albany, CA (US); Samuel Jacob, Fremont, CA (US); Ilya Minkin, Los Altos, CA (US); Richard John Heaton, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 188 days.

(21) Appl. No.: 16/368,263

(22) Filed: Mar. 28, 2019

(51) Int. Cl.
*G06F 9/44* (2018.01)
*G06F 8/41* (2018.01)
*G06F 11/30* (2006.01)
*G06F 9/38* (2018.01)
*G06F 11/22* (2006.01)
*G06F 9/455* (2018.01)
*G06F 11/36* (2006.01)
(Continued)

(52) U.S. Cl.
CPC ........ *G06F 9/3855* (2013.01); *G06F 11/2236* (2013.01); *G06F 8/41* (2013.01); *G06F 9/3017* (2013.01); *G06F 9/4451* (2013.01); *G06F 9/45516* (2013.01); *G06F 11/3466* (2013.01); *G06F 11/3612* (2013.01); *G06F 2009/45591* (2013.01); *G06F 2201/835* (2013.01)

(58) Field of Classification Search
CPC .... G06F 9/3855; G06F 9/4451; G06F 9/3017; G06F 9/45516; G06F 2009/45591; G06F 15/7814; G06F 16/2322; G06F 2201/835; G06F 11/25; G06F 11/26; G06F 11/2226; G06F 11/2236; G06F 11/3089; G06F 11/34; G06F 11/3409; G06F 11/3423; G06F 11/3452; G06F 11/3457; G06F 11/3461; G06F 11/3466; G06F 11/36; G06F 11/3604; G06F 11/3612; G06F 11/3616; G06F 11/362; G06F 11/3624; G06F 11/3628; G06F 11/3636; G06F 11/3656; G06F 8/41; G06F 2221/2151
USPC ........ 718/104–106; 712/225, 227; 714/38.1, 714/38.12, 38.13, 45, 47.1; 717/131
See application file for complete search history.

(56) References Cited

U.S. PATENT DOCUMENTS 8,176,475 B2* 5/2012 Kosche ............... G06F 11/3447
717/127
9,292,296 B2* 3/2016 Chen ..................... G06F 9/3857
(Continued)

*Primary Examiner* — Daniel H Pan
(74) *Attorney, Agent, or Firm* — Kilpatrick Townsend & Stockton LLP

(57) ABSTRACT

Systems and methods for non-intrusive hardware profiling are provided. In some cases integrated circuit devices can be manufactured without native support for performance measurement and/or debugging capabilities, thereby limiting visibility into the integrated circuit device. Understanding the timing of operations can help to determine whether the hardware of the device is operating correctly and, when the device is not operating correctly, provide information that can be used to debug the device. In order to measure execution time of various tasks performed by the integrated circuit device, program instructions may be inserted to generate notifications that provide tracing information, including timestamps, for operations executed by the integrated circuit device.

22 Claims, 8 Drawing Sheets

(51) Int. Cl.
*G06F 9/445* (2018.01)
*G06F 11/34* (2006.01)
*G06F 9/30* (2018.01)

(56) References Cited

U.S. PATENT DOCUMENTS

| | | | | |
|---|---|---|---|---|
| 2005/0071821 A1* | 3/2005 | Levine | ............... | G06F 11/348 717/130 |
| 2005/0149915 A1* | 7/2005 | Wu | ............... | G06F 9/45516 717/137 |

* cited by examiner

NON-INTRUSIVE HARDWARE PROFILING

BACKGROUND

Profiling is a form of measuring the execution time of a certain task performed by an integrated circuit device, typically with a breakdown to time per sub-task. It is an instrumental tool that can be used to optimize computer systems. In many cases, hardware modules are designed with embedded, dedicated logic to enable such profiling. In other cases, hardware can be manufactured without profiling capabilities, which limits the amount of visibility into the integrated circuit device once it is manufactured. Understanding the timing of operations, for example, data transfers of an integrated circuit device while the device is in operation, may help to determine whether the hardware of the device is operating correctly and, when the device is not operating correctly, provide information that can be used to debug the device. In addition, when the integrated circuit device executes program instructions, profiling can indicate the progression of the instructions and/or provide information such as whether the device is executing instructions at an expected rate or whether the device is transferring data at an expected rate.

BRIEF DESCRIPTION OF THE DRAWINGS

Various embodiments in accordance with the present disclosure will be described with reference to the drawings, in which.

DETAILED DESCRIPTION

Figure 1:
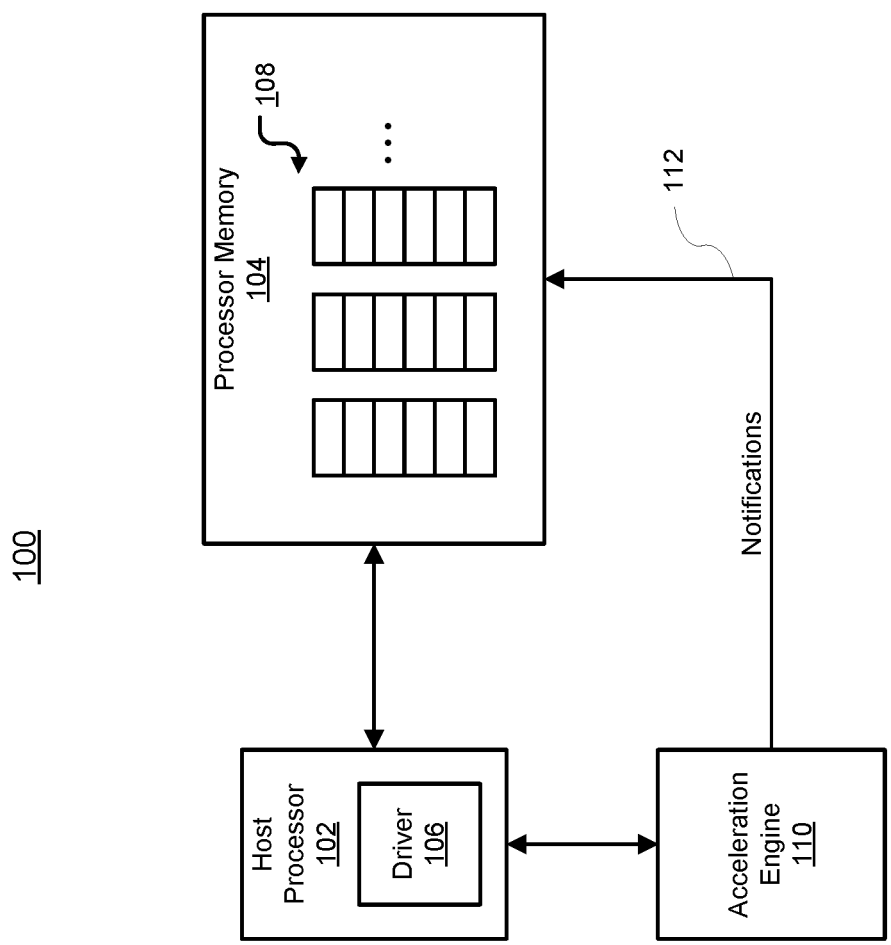
FIG. 1 is a block diagram illustrating an example of a computing system according to aspects of the present disclosure.

Direct memory access (DMA) engines are used to move data from DRAM locations to caches and other memories on a chip. In the context of an inference accelerator, a DMA engine may be used to load data (e.g., input values/weight values) from an external memory into an on-chip memory just before that data is used for computation. For example, a DMA engine may load input values and/or weight values from host system memory to a state buffer of an execution engine for neural network computations. Timely scheduling of DMA transfers can achieve minimum memory residency time of data while also minimizing the amount of time an execution engine waits for data to be loaded.

Capability for tracing execution engine operations may be used to profile execution engine performance. In some cases, an execution engine, for example a DMA engine, may not natively include the capability to provide tracing information. While it is possible to know when a program triggered a DMA operation, provided that the corresponding executing block is traceable, it may not be known when the DMA operation actually starts and finishes since the DMA engine might be executing a previous set of DMA operations and may not immediately start executing the currently triggered DMA operation.

In accordance with various aspects of the present disclosure systems, methods, and devices for generating tracing information for execution engines of an integrated circuit device are provided.

In some cases, an execution engine of an integrated circuit device may not natively support tracing of its performance. Tracing information for the execution engine that does not natively provide support may be generated by writing a value to a register associated with an instruction queue for the execution engine. Writing the value may cause a notification, including a timestamp and possibly additional metadata, to be generated indicating that the execution engine is about to execute an operation. After the execution engine executes the operation, another value may be written to the register causing another notification, including a timestamp and metadata, to be generated indicating that the execution engine completed execution of the operation. Notifications may be generated at the beginning and end of each operation executed by the execution engine, thereby creating a timeline of the operation of the execution engine. The timeline of the execution engine operation can be reconstructed from the sequence of notifications and associated information (e.g., notification type, a timestamp, internal status, etc.) that may be included in the notifications.

A computing system may implement the notification generation with notification logic included in the computing system. When a value is written to a register, for example, an event register, associated with an instruction queue for an execution engine, the notification logic may detect that a value was written to the event register and may generate a notification including a timestamp and metadata. Values may be written to the register and corresponding notifications generated by the notification logic at the beginning and end of each operation executed by the execution engine to create a timeline profiling the operation of the execution engine.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 is a block diagram illustrating an example of a computing system 100 according to aspects of the present disclosure. In this example computing system 100, an integrated circuit device referred to herein as an acceleration engine 110 includes a notification mechanism that enables the acceleration engine 110 to output information about the acceleration engine internal operations. Notifications are a mechanism to generate messages during program execution based on triggers within the program, as well as other factors, such as error conditions. The example computing system 100 further includes a host processor 102 and a driver program 106 that may be executing on the host processor 102. The computing system 100 can include other components that are not illustrated here.

The host processor 102 of this example is a general purpose processor for executing program instructions. The host processor 102 can also be referred to as the computing system's primary processor, and/or as a Central Processing Unit (CPU). The host processor 102 can be implemented using an integrated circuit. In some examples, the host processor 102 can include multiple processing cores. In some examples, the computing system 100 can include more than one host processor, possibly working in a coordinated manner.

The host processor 102 can be responsible for the overall management and control of the example computing system 100, including executing the computing system's operating system. Operations that the host processor 102 can be responsible for include, for example, executing programs such as device drivers that manage other hardware components in the computing system 100, and processing or responding to input from users or other computing systems, among other examples. In the illustrated example, the host processor 102 may execute a driver program 106 that manages the operations of the acceleration engine 110.

The host or processor memory 104 is a memory used by the host processor 102 for temporary storage of program code that the host processor 102 is in the process of executing, and/or values on which the host processor 102 is operating. For example, the code for the driver program 106 can be stored in the host or processor memory 104 while the host processor 102 is executing the driver program 106. The host or processor memory 104 may be Dynamic Random Access Memory (DRAM), though other volatile memory technologies can be used, including, for example, Static RAM (SRAM), Synchronous Dynamic RAM (SDRAM), and Double Data Rate Synchronous Dynamic RAM (DDR), among other types of memory. In various examples, non-volatile memory types, such as Flash-based memory, can be used for the host or processor memory 104.

The acceleration engine 110 is an integrated circuit device that can be capable of executing program code. The acceleration engine 110 can be, for example, a type of processor, such as a floating point processor, a graphics processor, a neural network processor, a special-purpose processor, or any other type of integrated circuit device that can execute program code. For example, the acceleration engine 110 can be a special-purpose processor that executes program code for orchestrating the movement of data within the computing system 100. The acceleration engine 110 may be different from the host processor 102 in that the acceleration engine 110 may be designed to perform certain functions, such as floating point calculations or graphics rendering, more efficiently than when these operations are performed by the host processor 102. The acceleration engine 110 can thus offload these operations from the host processor 102, so that the host processor 102 can be free to perform other operations.

The acceleration engine 110 is purpose built to perform certain operations that can be performed by the processor 102, but can be performed faster by the acceleration engine 110. For example, the acceleration engine 110 can be a neural network accelerator, and, as such, may be able to perform the large scale, parallel computations of a neural network more efficiently than when the computations are performed by the processor 102. As another example, the acceleration engine 110 can be a graphics processing unit (GPU), and may be optimized to perform the computations needed for graphics rendering. Other examples of devices that can be implemented by the acceleration engine 110 include cryptographic accelerators, compression and decompression accelerators, 3-D accelerators, regular expression accelerators, security accelerators, and others.

In various examples, the acceleration engine 110 can execute program code to perform certain operations. For example, when the acceleration engine 110 is a neural network accelerator, the acceleration engine 110 can be programmed to execute a particular neural network, such as one that performs image recognition or one that performs machine translation. As a further example, to support the execution of a neural network, the acceleration engine 110 can be programed to perform operations such as copying data for the neural network from the host or processor memory 104 (for example) into the acceleration engine 110, copying input data for the neural network from the host or processor memory 104 into the acceleration engine 110, and/or copying results from the acceleration engine 110 into the host or processor memory 104, among other examples.

The acceleration engine 110 may include a one or more execution engines. Examples of types of execution engines the acceleration engine 110 can have include a computational array (also referred to as a an array of processing engines), a computation engine executing an activation function, a computation engine executing a pooling operation, and a direct memory access (DMA) engine, among other examples.

To generate program code for the acceleration engine 110, in various examples, the computing system 100 can execute a compiler. Compilers, in general, are software programs that translate program code written in a human-readable language into a format (e.g., machine instructions) that can be read and processed by an integrated circuit device. In the example of FIG. 1, the acceleration engine 110 is a neural network accelerator and the compiler is for compiling a neural network description into instructions to be executed by the acceleration engine 110. When the acceleration engine 110 implements a different type of accelerator, another compiler can be used.

Processing by the compiler can include identifying steps to be performed by the processor 102, rather than by the acceleration engine 110. For example, the processor 102, through the execution of a driver program 106, may need to perform steps such as configuring Direct Memory Access (DMA) descriptors for moving data into or out of the acceleration engine 110, among other examples.

In the example of FIG. 1, the computing system 100 can be executing a driver program 106, which can also be referred to as a device driver or runtime driver, that manages the acceleration engine 110. The driver program 106 can provide an interface between applications executing on the computing system 100 (or on another host system) and the acceleration engine 110. For example, the driver program 106 can provide an Application Program Interface (API) that defines functions for feeding input data to the acceleration engine 110 and defining the operation to perform on the input data. In this and other examples, the driver program 106 can configure the acceleration engine 110 to perform the operation. For example, the driver program 106 can identify a neural network that the acceleration engine 110 is to execute, as well as the location in the host or processor memory 104 or on a storage device (not shown) where the compiled code for the neural network is located. The driver program 106 can further load into the acceleration engine 110 or cause the acceleration engine 110 to load the compiled code, can load or cause the acceleration engine 110 to load the input data on which the neural network is to operate, and/or can cause the acceleration engine 110 to being executing on the input data. Once the acceleration engine 110 has finished, the acceleration engine 110 can notify the driver program 106, and the driver program 106 can deliver a result back to the application that requested the result.

In various examples, the acceleration engine 110 can include a notification mechanism that enables the acceleration engine 110 to output notifications 112 that describe operations internal to the acceleration engine 110. In various examples, the acceleration engine 110 can write the notifications 112 to notification queues 108 in the host or processor memory 104. The host or processor memory 104 can include one or more notification queues 108, where different queues can be used to store notifications of different types. For example, a queue can be designated for storing error notifications, a queue can be designated for storing event notifications, and a queue can be designated for storing explicit notifications. As a further example, different queues can be designated for storing different event notifications, and/or different error types, and/or different explicit notifications. In some examples, the acceleration engine 110 can, alternatively or additionally, write notifications to other memories in the computing system 100, such as the memory of a transmitter that can send the notifications, over a network, to another computing system.

In various examples, the driver program 106 can configure the notification queues 108, in addition to performing other operations. Configuring the notification queues 108 can include, for example, determining a size for each queue and requesting an allocation of memory for each queue. The operating system can, for example, allocate for each queue a portion of the memory allocated to the driver program 106, or can allocate additional space in the host or processor memory 104. From the allocated memory, the driver program 106 can determine a base address for each queue. The driver program 106 can further provide the base address and size, and other information about each queue to the acceleration engine 110 so that the acceleration engine 110 has the information to be able to write to the queues. In various examples, the acceleration engine 110 can operate the notification queues 108 as first-in, first-out (FIFO) buffers.

In various examples, an operation of the driver program 106 can include reading notifications from the notification queues 108, and determining what, if anything, should be done with the information provided in a notification. For example, the driver program 106 can sort the notifications by the timestamps included in the notifications, and can output the sorted notifications to a display or to a file. As another example, the driver program 106 can respond to some notifications, such as error notifications, by stopping or resetting the acceleration engine 110. In other examples, the driver program 106 can otherwise change the operation of the acceleration engine 110 as a result of a notification.

In accordance with various aspects of the present disclosure, profiling (i.e., measuring start, end, and duration of various tasks) capabilities are provided for "closed" functional blocks (i.e., functional blocks without native profiling capabilities), such as closed execution engines, using notifications. The following examples will be explained with respect to DMA engines; however, one of ordinary skill in the art will appreciate that this is for ease of explanation and that other execution engines capable of performing memory bus writes may be used without departing from the scope of the present disclosure.

Direct memory access (DMA) engines are used to move data from DRAM locations to memories on an integrated circuit device. In the context of an inference accelerator, a DMA engine may be used to load data (e.g., input values/ weight values) from an external memory into an on-chip memory (e.g., a state buffer) just before that data is used for computation. For example, a DMA engine may load input values and/or weight values from host system memory to a state buffer of an execution engine for neural network computations. Thus, a DMA engine provides the capability to execute data transfers. A DMA engine may support a multiple of DMA queues, each DMA queue including memory instructions, also referred to herein as descriptors. The DMA queues may be configured in the host system processor memory or another memory. Each descriptor may include a source address, destination address, and transfer size for the data transfers. For example, the DMA queues may be configured by the compiler at compile time.

Similarly, the DMA descriptors may be generated by the compiler.

Execution of DMA data transfers resulting from execution of descriptors in a particular DMA queue may be traced by augmenting each DMA data transfer with two writes to an event register-one write to set the event at the beginning of the DMA data transfer and another write to clear the event at the end of the DMA transfer. In some implementations, the set and clear instructions may be inserted by the compiler or by the driver program. In some implementations, set and clear instructions may be inserted by both the compiler and the driver program. Each write to the event register generates a notification including a timestamp that may be output to a notification queue (e.g., notification queues 108) configured in processor memory or another memory. The notification queue may subsequently be read and processed, for example, by the driver program 106, and the notification information used to profile the DMA engine. For example, the notifications can be used to generate a timeline of the operations performed by the DMA engine.

Figure 2:
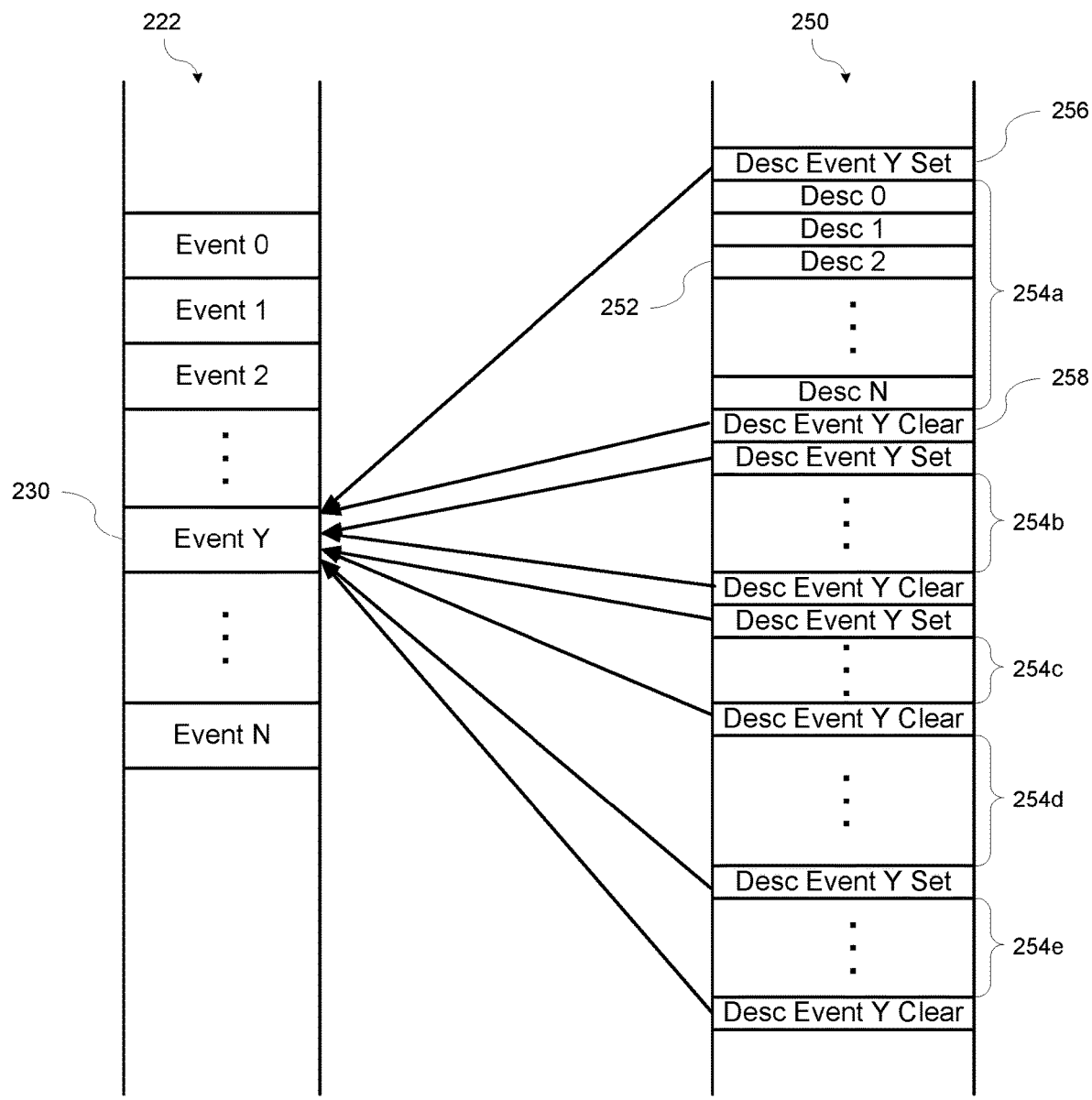
FIG. 2 is a diagram illustrating an example of an event register and a DMA queue according to aspects of the present disclosure.

FIG. 2 is a diagram illustrating a an event register and a DMA queue according to aspects of the present disclosure. Referring to FIG. 2, the DMA queue 250 may be configured with a plurality of descriptors 252 indicating a source address, destination address, and transfer size for the data transfers. Since a DMA engine may be required to transfer a large amount of data, a complete data transfer operation may execute multiple descriptors, e.g., a DMA descriptor block 254a, to complete the data transfer operation. FIG. 2 illustrates multiple DMA descriptor blocks 254a-254e corresponding to complete data transfer operations. Each DMA descriptor block 254a-254e may be preceded by a "set event" instruction 256 and followed by a "clear event" instruction 258. Each DMA queue 250 may be associated with a particular event in the event register, for example, the event register 222 in the processor utilities block 300 (see FIG. 3). In the current example, the DMA queue 250 is associated with event Y 230 in the event register 222. Execution of the compiled application program, for example a neural network, may trigger execution of DMA descriptors in one or more DMA queues.

When execution of the DMA descriptors in the DMA queue 250 is triggered, event Y 230 may be set by the "set event" instruction 256 when the DMA engine is triggered to execute the first DMA descriptor block 254a to perform a data transfer operation. For example, the first DMA descriptor block 254a may transfer input values and/or weight values from host system memory to a state buffer of an execution engine. The processor utilities block 300 may determine that the event Y 230 in the event register 222 was set and may generate a notification. The notification may be written to one the notification queues (e.g., notification queues 108) in the processor memory 104 associated with DMA queue 250. In various examples, the notification can include information such as a notification type, a timestamp indicating when the notification was generated, and/or information about an internal status of the integrated circuit device.

Similarly, when execution of the first DMA descriptor block 254a is complete, a "clear event" instruction 258 may be executed from the DMA queue 250 by the execution engine. The processor utilities block 300 may determine that the event Y 230 in the event register 222 was cleared and may generate a second notification. The second notification may be written to the notification queue in the processor memory 104 associated with DMA queue 250. The second notification may also include information such as a notification type, a timestamp indicating when the second notification was generated, information about an internal status of the integrated circuit device, etc.

When the first DMA descriptor block 254a has been completed, Event Y 230 may again be set by a "set event" instruction at the beginning of execution of the a second DMA descriptor block 254b. The processor utilities block 300 may determine that the event Y 230 in the event register 222 was set again and may generate another notification. The notification may be written to one the notification queues (e.g., notification queues 108) in the processor memory 104 associated with DMA queue 250. The notification may include information such as a notification type, a timestamp indicating when the second notification was generated, information about an internal status of the integrated circuit device, etc. When execution of the second DMA descriptor block 254b is complete, a "clear event" instruction 258 may be executed from the DMA queue 250 by the execution engine. The processor utilities block 300 may determine that the event Y 230 in the event register 222 was cleared and may again generate a notification. The notification may be written to the notification queue in the processor memory 104 associated with DMA queue 250. The notification may also include information such as a notification type, a timestamp indicating when the second notification was generated, information about an internal status of the integrated circuit device, etc.

Notifications may be generated at the beginning and end of each DMA descriptor block 254a-254e by sequentially setting and clearing the event Y associated with the DMA queue 250 as the descriptors in the DMA queue 250 are executed, thereby creating a timeline of the operation of the DMA engine. The timeline of the DMA engine operation can be reconstructed from the sequence of notifications and associated information (e.g., notification type, a timestamp, internal status, etc.) written to the notification queue associated with the DMA queue 250.

A DMA engine may support a plurality of DMA queues, for example, queues used to transfer weights, biases, inputs, outputs, instructions, etc., and all of the DMA queues or any subset of the DMA queues may be traced in this manner. A full profile covering data transfer rates may be generated by matching notifications against additionally collected debug information that includes descriptions of DMA operations.

In accordance with aspects of the present disclosure, notifications may be generated by writing to a specified notification register. In some implementations, the notification register may be, for example, a specific one of the event registers in the processor utilities block 300. In other implementations, the notification register may be a register separate from the event registers in the processor utilities block 300. In some implementations, the notification register may be a register disposed on the integrated circuit device in a location other than in the processor utilities block 300 or in host system memory. In some examples, the value written to the notification register may be a DMA queue identifier or other value associated with the DMA queue indicating the DMA queue performing the write operation.

Execution of DMA data transfers resulting from execution of descriptors in a particular DMA queue may be traced by augmenting each DMA data transfer with two writes, for example two writes of the DMA queue identifier, to the notification register-one write at the beginning of the DMA data transfer and another write at the end of the DMA transfer. In some implementations, the write instructions may be inserted by the compiler or by the driver program. In some implementations, the write instructions may be inserted by both the compiler and the driver program.

A change in value of the notification register contents (i.e., a write to the register) may generate a notification. For example, an identifier of a first DMA queue may be written to the notification register. The processor utilities block 300 may determine that the identifier of the first DMA queue notification was written to the notification register and may generate a notification associated with execution of the DMA descriptors in the first DMA queue. The notification may be written to the notification queue in the processor memory 104 associated with the DMA queue having the first DMA queue identifier. The notification may also include information such as a notification type, a timestamp indicating when the notification was generated, information about an internal status of the integrated circuit device, etc.

Repeated writes of the first DMA queue identifier to the notification register before and after each DMA descriptor block by executing descriptors in the first DMA queue may generate a timeline of the operation of the DMA engine executing the descriptors in the first DMA queue.

The timeline of the DMA engine operation can be reconstructed from the sequence of notifications and associated information (e.g., notification type, a timestamp, internal status, etc.) written to the notification queue associated with the DMA queue 250.

An identifier of a second DMA queue may also be written to the notification register. The processor utilities block 300 may determine that the identifier of the second DMA queue was written to the notification register and may generate a notification associated with execution of the DMA descriptors in the second DMA queue. The notification may be written to the notification queue in the processor memory 104 associated with the DMA queue having the second DMA queue identifier. The notification may also include information such as a notification type, a timestamp indicating when the notification was generated, information about an internal status of the integrated circuit device, etc.

Repeated writes of the second DMA queue identifier to the notification register before and after each DMA descriptor block by the executing the second DMA queue may generate a timeline of the operation of the DMA engine executing the second DMA queue. The timeline of the DMA engine operation can be reconstructed from the sequence of notifications and associated information (e.g., notification type, a timestamp, internal status, etc.) written to the notification queue associated with the DMA queue 250. The first DMA queue and the second DMA queue may be executed by the same or different DMA engines.

Figure 3:
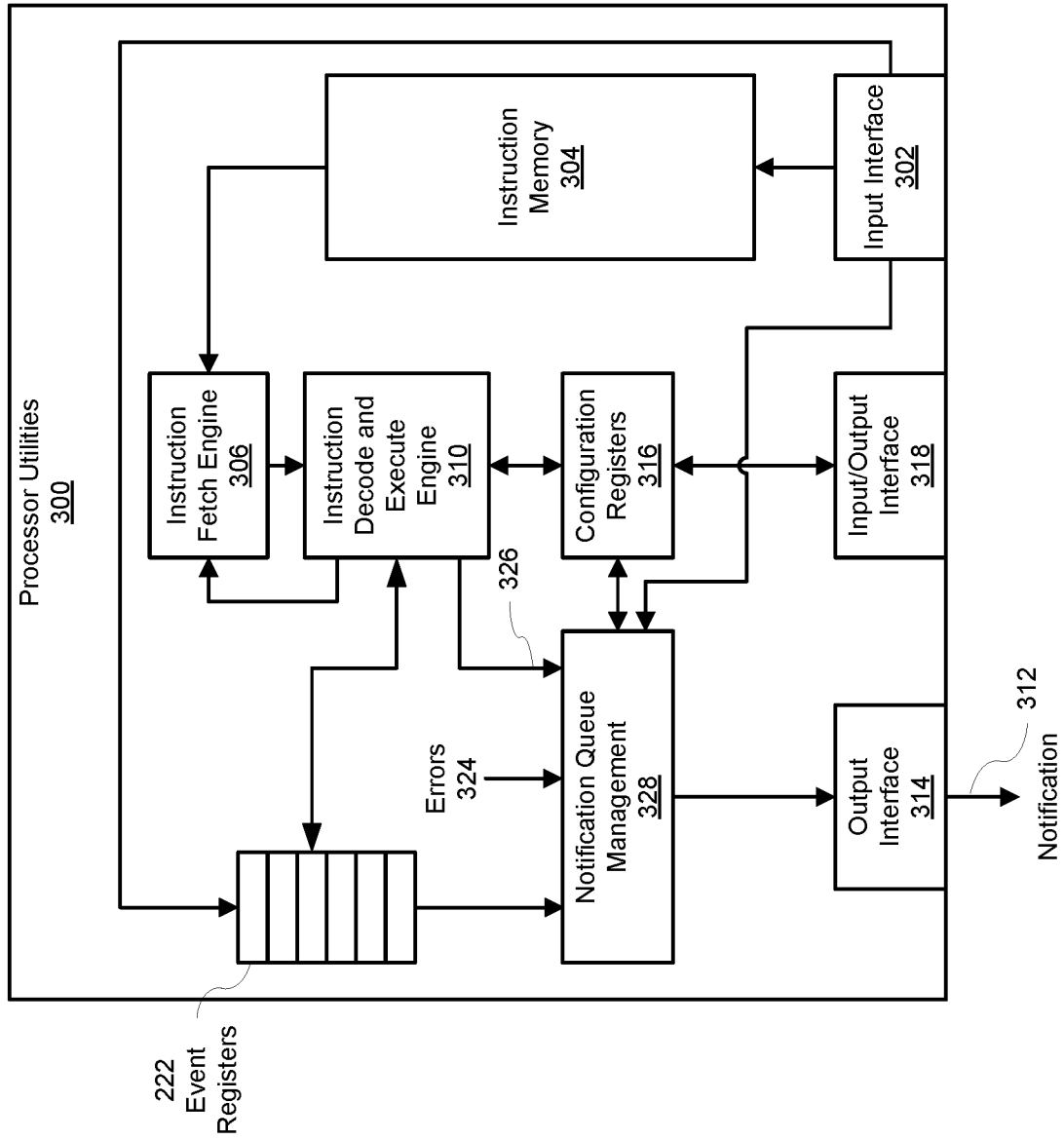
FIG. 3 is a block diagram illustrating an example of processor utilities block that can include a notification mechanism according to aspects of the present disclosure.

FIG. 3 is a block diagram illustrating an example of processor utilities block 300 that can include a notification mechanism according to aspects of the present disclosure. The notification mechanism may include notification logic for generating notifications based on program execution. In some examples, the processor utilities block 300 can be incorporated into a larger integrated circuit device. For example, the processor utilities block 300 can be a component in an acceleration engine.

In the example illustrated in FIG. 3, the processor utilities block 300 may include an input interface 302, an instruction memory 304, an instruction fetch engine 306, an instruction decode and execute engine 310, event registers 222, a notification queue management 328 component, and an output interface 314. The processor utilities block 300 may further include configuration registers 316 and a combined input/output interface 318 that can provide an alternative interface for exchanging data with other components in the computing system. The processor utilities block 300 can include other components that are not illustrated here. In various examples, each of the blocks illustrated in the example of FIG. 3 can include a portion of the overall integrated circuitry of the processor utilities block 300.

In various examples, the input interface 302 provides the processor utilities block 300 with the ability to receive data from other components in the computing system. The data can include program code and other data. For example, a driver program that controls the operation of the processor utilities block 300 can cause program code to be written to the processor utilities block 300, which is received at the input interface 302. As a further example, the driver program can also issue a write transaction to update a header pointer for a queue managed by the notification queue management 328, and this write transaction can be received at the input interface 302. The input interface 302 can be implemented, for example, as an Advanced Extensible Interface (AXI) slave interface, for when the computing system's communication fabric includes an AXI bus structure. In various examples, other bus structures and bus protocols can be used.

In various examples, the instruction memory 304 can provide the processor utilities block 300 with local storage for program code. The instruction memory 304 can be managed by the instruction fetch engine 306, which can keep track of free space in the instruction memory 304, space that is storing not-yet-executed instructions, and space that is storing instructions that the processor utilities block 300 has already executed. The instruction fetch engine 306 can further keep track of the next instruction that is to be executed, and can fetch this instruction when the instruction decode and execute engine 310 is ready for another instructions, or possibly in advance of the instruction decode and execute engine 310 being ready.

In various examples, the processor utilities block 300 can include an event mechanism that may be used to determine whether certain operations, for example at other devices such as DMA engines, have occurred. The event mechanism can output notifications without having to conduct time consuming I/O operations when a change in the status of an event occurs.

Additionally, the processor utilities block 300 can use a single time source for adding timestamps to the notifications, so that the notifications can be used to reconstruct a timeline of the operation of the integrated circuit device. The notification mechanism thus enables visibility into the operation of the integrated circuit device, debugging information about both the hardware and the execution of software code, and the ability to measure the performance of the integrated circuit device, as well as other uses.

Events may be set or cleared by components external to the processor utilities block 300, such as other integrated circuit devices in the computing system. An event is the changing of the status of register in the event registers 222.

The change can be, for example, the setting of a value in the register, or the clearing (e.g., writing to zero) of the register. The event registers 222 are a type of memory location in the integrated circuit device that can be written to by the execution units, for example, but not limited to DMA engines, of the integrated circuit device, and, in some cases, also be written to be devices outside of the integrated circuit device. The integrated circuit device may have a fixed or limited number of event registers. In some examples, the event registers may be included in the memory subsystem of the integrated circuit device as separate registers. In other examples, the event registers may be disposed in other portions of the integrated circuit device or in the host memory. Each event may have a dedicated address space to set and clear an event, and a notification may be generated for any write to this address space.

A change in the status of one of the event registers 222 can cause the processor utilities block 300 to send a notification 312. For example, when the event register is set, the notification queue management 328 can determine to send a notification 312 that identifies the register, and indicates that the register was set. In various examples, the notification queue management 328 can also send a notification 312 when the event register is cleared. An event register may be set when, for example, the register contains a value of "1" and may be cleared when the register contains a value of "0," or vice-versa In these and other examples, the notification 312 can provide information about when events occurred.

In various examples, whether the notification queue management 328 generates a notification 312 when the status of an event register changes can be enabled or disabled. For example, the configuration registers 316 can include a register for each event that indicates whether a change to the register for the event should cause a notification 312 to be generated.

In various examples, notifications for different event registers can be written to the same queue in processor memory or in different queues. For example, the configuration registers 316 can include one set of registers (e.g., for information such as a base address, a head pointer, and a tail pointer) for one queue in the processor memory, can include a set of registers for each of the events, or can include a set of registers for sets of events, such as groups of eight or more events. In various examples, the number of queues used can be configured by the driver program.

In various examples, a notification 312 can also be generated when the processor utilities block 300 encounters an error 324. Errors 324 can occur due to a problem in the operation of the hardware of the processor utilities block 300, due to misconfiguration of the processor utilities block 300, because of problems in the program code, and/or due to the processor utilities block 300 receiving problematic instructions from other components in the computing system, among other examples. Errors 324 can be detected, for example, by the instruction decode and execute engine 310, such as when the instruction decode and execute engine 310 encounters an instruction that cannot be decoded or that contains invalid fields, among other examples. In these and other examples, the notification queue management 328 can generate a notification 312 that identifies the error 324.

In various examples, the notification queue management 328 can also generate a notification 312 upon the instruction decode and execute engine 310 decoding an explicit instruction for generating a notification. This type of notification is referred to herein as an explicit notification 326. The notification instruction can enable program code to output notifications at any point during the execution of the program code. The notification instruction can, thus, be used to indicate that a certain set of instructions have been executed or a count of iterations of a loop in the code, among other examples. The explicit notification 326 can provide similar information as a print statement in the program code without the overhead of having to conduct I/O operations.

In some examples, the generation of explicit notifications 326 can also be enabled or disabled through registers in the configuration registers 316. For example, the configuration registers 316 can include a register that, if set, disables or enables all explicit notifications 326. As another example, the configuration registers 316 can include one or more registers that can identify explicit notifications 326 that are enabled or disabled. The explicit notification 326 can be identified, for example, by a token or counter identifier indicated by the instruction that triggers generation of the notification.

In various examples, explicit notifications 326 can be written to the same queue in the processor memory or to different queues. For example, the configuration registers 316 can include one or multiple sets of registers, where each set of registers is associated with a queue in the processor memory. In this example, each set of registers can store information such as the base address, head pointer, and tail pointer for each queue. In some examples, the driver program may configured a limited set of queues for the explicit notifications 326, such as four, eight, sixteen, or another number of queues. In these examples, a token identifier, counter, identifier or other information included in a notification instruction can designate to which queue the notification 312 should be written.

In addition to generating notifications, the notification queue management 328 can perform other management operations for the notifications. For example, the notification queue management 328 can include a timestamp generator, from which each notification can obtain a timestamp. In this and other examples, the notifications can each obtain a timestamp from the same source, so that the notifications can be correlated to one another based on the timestamps. Additionally, for example, when multiple errors occur concurrently (e.g., in the same clock cycle), or errors occur concurrently with a change of status of an event or an explicit notification 326, or the notification queue management 328 otherwise receives simultaneous requests to generate notifications, the notification queue management 328 can apply the same timestamp to each notification generated. That is, the notification queue management 328 need not queue simultaneous notification requests, and can instead handle each request at the same time (e.g., within the same clock cycle). By applying the same timestamp to concurrently occurring notifications, the notifications can indicate different things that occurred in the accelerator engine 110 at the same time.

The notification queue management 328 can further keep track of the notification queues in the processor memory (and/or another external memory). For example, the configuration registers 316 can include registers that store information such as a base address and size for each queue, as well as the current head pointer location and tail pointer location for each queue. In this example, the notification queue management 328 can update the tail pointer of a queue upon sending a notification 312 to the queue. The notification queue management 328 can, for example, cause a transaction to be sent, either through the output interface 314 or the combined input/output interface 318, that indicates the update to the tail pointer. As another example, the notification queue management 328 can check whether queues are full by examining the head and tail pointers of the queues.

In various examples, the notification queue management 328 can further include a physical queue for storing outgoing notifications. A hardware queue can enable the notification queue management 328 to store notifications that are generated concurrently (e.g., in the same clock cycle), for example. The hardware queue can also enable the notification queue management 328 to store notifications when the output interface 314 is busy being used to output other data. In these and other examples, additional errors that the notification queue management 328 can detect include the hardware queue being full when the notification queue management 328 has more notifications to generate.

In various examples, the output interface 314 provides the processor utilities block 300 with an interface through which the processor utilities block 300 can output data to other components in the computing system. The output interface 314 can, for example, connect to a communication fabric in the computing system. The output interface 314 can be implemented, for example, as an AXI master interface, for connecting to an AXI bus structure. In various examples, other bus structures and bus protocols can be used.

In various examples, the configuration registers 316 can be read from and written to through a combined input/output interface 318. The combined input/output interface 318 can provide the processor utilities block 300 with an alternate communication path to other components in the system. This path can be slower than the paths used by the input interface 302 and the output interface 314, or may provide a more direct connection to the primary processor. In some examples, the combined input/output interface 318 is optional, and the processor utilities block 300 receives transactions for the configuration registers 316 at the input interface 302, and sends data form the configuration registers 316 out through the output interface 314.

Figure 4:
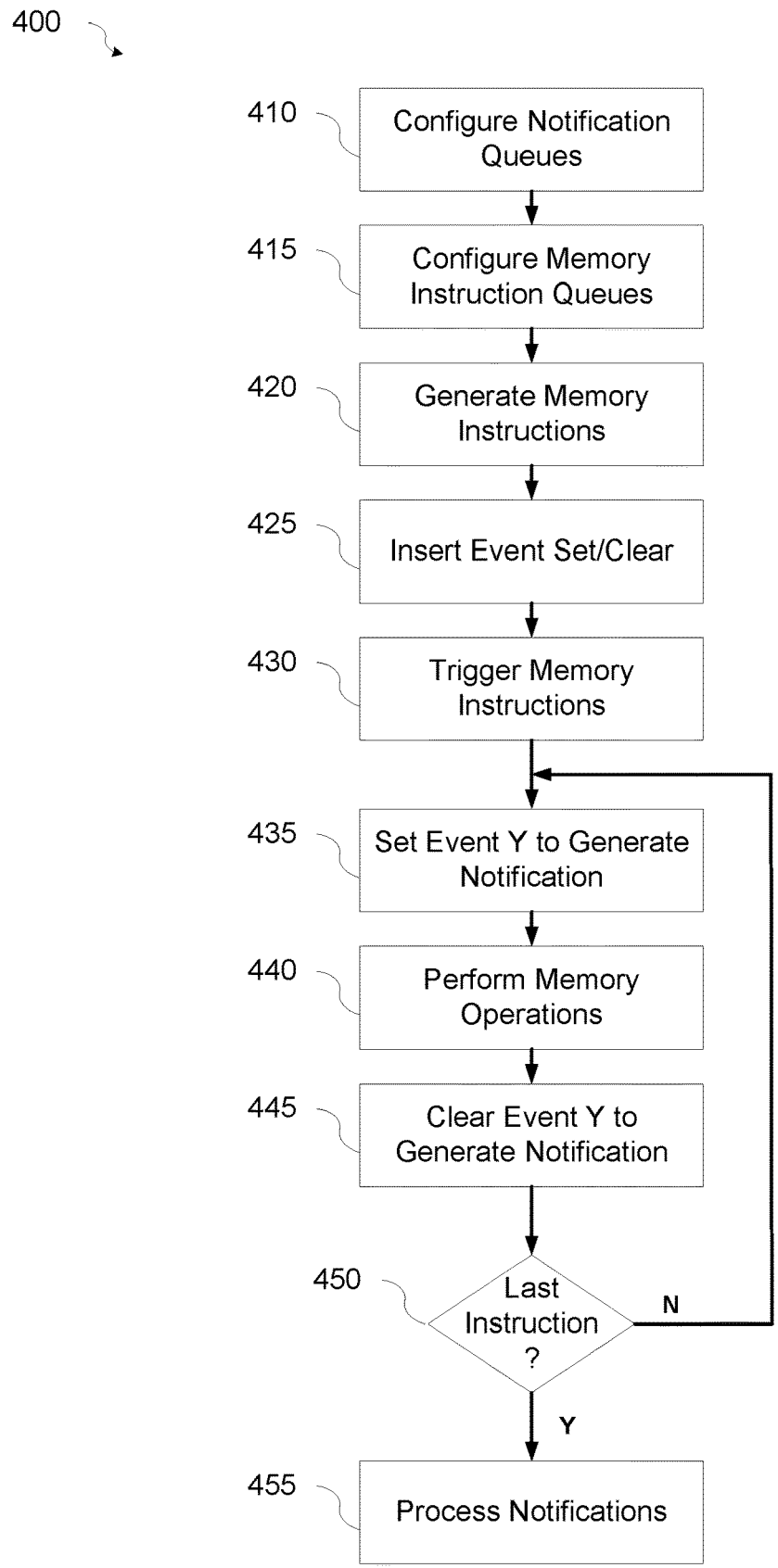
FIG. 4 is a flowchart illustrating an example of a process for providing nonintrusive hardware profiling capabilities according to aspects of the present disclosure.

FIG. 4 is a flowchart illustrating an example of a process 400 for providing nonintrusive hardware profiling capabilities according to aspects of the present disclosure. These methods may be implemented by the systems described above, such as for example the computer system of FIG. 1.

Referring to FIG. 4, at operation 410 notification queues may be configured. In various examples, the driver program 106 can configure the notification queues, for example the notification queues 108. Configuring the notification queues may include, determining a size for each queue and requesting an allocation of memory for each queue, among other things. The operating system may allocate for each queue a portion of the memory allocated to the driver program or may allocate additional space in the processor memory. Different queues can be designated for storing different event notifications, and/or different error types, and/or different explicit notifications.

At operation 415, memory instruction queues may be configured. The memory instruction queues, also referred to herein as DMA queues, may be configured in the host system processor memory or another memory. The DMA queues may be configured by the compiler at compile time. At operation 420, memory instructions may be generated. The memory instructions, also referred to herein as DMA descriptors, may be generated by the compiler. Each descriptor may include a source address, destination address, and transfer size for data transfers.

At operation 425, event set and clear instructions may be inserted. Execution of descriptors in a particular DMA queue may be traced by augmenting each DMA data transfer with two writes to an event register-one write to set the event at the beginning of the DMA data transfer and another write to clear the event at the end of the DMA transfer. The set event and clear event instructions may write values to an event register associated with the DMA queue executing the descriptors. Writing to the event register may generate notifications. For example, the set event instruction may write a value of "1" to the event registered to set the event and the clear event instruction may write a "0" to the event registered to clear the event. The set and clear instructions may be inserted by the compiler or by the driver program. In some implementations, set and clear instructions may be inserted by both the compiler and the driver program.

A DMA engine may support a plurality of DMA queues. In some implementations, notifications may be generated by writing to a specified notification register. The notification register may be, for example, a specific one of the event registers in the processor utilities block, a register separate from the event registers in the processor utilities block, a register disposed on the integrated circuit device in a location other than in the processor utilities block, or a register in host system memory. The value written to the notification register may be a DMA queue identifier or other value associated with the DMA queue indicating the DMA queue performing the write operation. Similar to the set and clear instructions, the instructions to write to the notification register may be inserted by the compiler and/or the driver program as first and last instructions of each DMA descriptor block to be executed.

At operation 430, execution of the memory instructions may be triggered. Execution of the DMA descriptors may be triggered, for example, by execution of a compiled application such as a neural network or another application.

At operation 435, the event set instruction may generate a notification. The set event instruction may be a first instruction executed in a DMA descriptor block. A DMA descriptor block may be a set of DMA descriptors executed to perform a data transfer operation. For example, a set of DMA descriptors may be executed to transfer weights for a neural network from host system memory to a state buffer in the acceleration engine. The write to the event register may generate a notification including a timestamp that may be output to a notification queue (e.g., notification queues 108) configured in processor memory or another memory. The notification queue may subsequently be read and processed, for example, by the driver program, and the notification information used to profile the DMA engine.

At operation 440, memory operations may be performed. The DMA engine associated with the DMA queue, for example the DMA queue 250, may be triggered by the application program to execute the DMA descriptors in the DMA descriptor block to perform the data transfers.

At operation 445, the event clear instruction may generate a notification. The clear event instruction may be a last instruction executed in the DMA descriptor block. For example, the DMA engine may complete execution of the set of DMA descriptors to transfer the weights for the neural network from host system memory to the state buffer in the acceleration engine. The write to the event register may generate a notification including a timestamp that may be output to a notification queue (e.g., notification queues 108) configured in processor memory or another memory. The notification queue may subsequently be read and processed, for example, by the driver program, and the notification information used to profile the DMA engine. In some implementations, a write to the notification register as explained above with respect to operation 425 may be the last instruction executed in the DMA descriptor block to generate the notification.

At operation 450, in response to determining that a last instruction has not been reached (450—N), the process may continue executing instructions at operation 435. Execution of subsequent DMA descriptor blocks, each preceded by a set event instruction and followed by a clear event instruction to generate notifications at the beginning and end of each data transfer performed by the DMA descriptor block, may be performed. In response to determining that a last instruction has been reached (450—Y), at operation 455, the notifications may be processed. For example, the host processor may cause the driver program to retrieve the notifications from the notification queues and output the notifications to an output device, for example, a display device, a printer, and/or write the notifications to a file. The notifications may then be analyzed to trace the operation of the associated execution engines. In some embodiments, the processing of the notifications may include identifying, by the host process, various characteristics of memory instruction execution, for example, but not limited to, execution timing of DMA descriptor blocks.

It should be appreciated that the specific operations illustrated in FIG. 4 provide a particular method for providing nonintrusive hardware profiling capabilities according to an embodiment of the present invention. Other sequences of operations may also be performed according to alternative embodiments. For example, alternative embodiments of the present invention may perform the operations outlined above in a different order. Moreover, the individual operations illustrated in FIG. 4 may include multiple sub-operations that may be performed in various sequences as appropriate to the individual operation. Furthermore, additional operations may be added or removed depending on the particular applications. One of ordinary skill in the art would recognize many variations, modifications, and alternatives.

Figure 5:
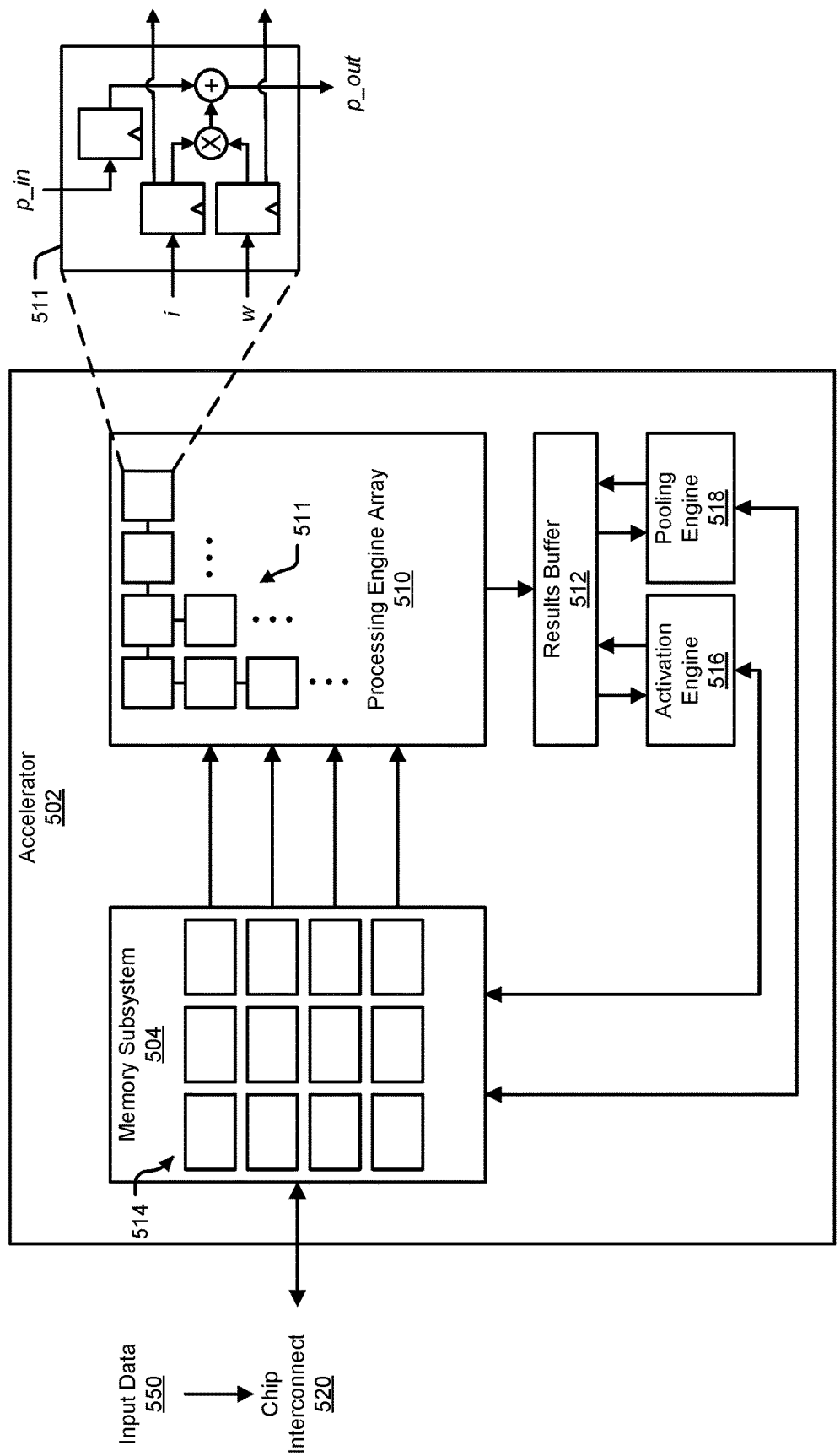
FIG. 5 is a block diagram illustrating an example of an integrated circuit device.

FIG. 5 is a block diagram illustrating an example of an integrated circuit device that can include nonintrusive hardware profiling capabilities. The example of FIG. 5 illustrates an accelerator 502. In various examples, the accelerator 502, for a set of input data (e.g., input data 550), can execute computations using a processing engine array 510, an activation engine 516, and/or a pooling engine 518. In some examples, the example accelerator 502 may be an integrated circuit component of a processor, such as a neural network processor. The processor may have other integrated circuit components, including additional accelerator engines.

In various implementations, the memory subsystem 504 can include multiple memory banks 514. In these implementations, each memory bank 514 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 514. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 504 can permit simultaneous access to the read or write channels of multiple memory banks. As another example, the memory subsystem 504 can include arbitration logic such that arbitration between, for example, the outputs of multiple memory banks 514 can result in more than one memory bank's output being used. In these and other examples, though globally managed by the memory subsystem 504, each memory bank can be operated independently of any other.

Having the memory banks 514 be independently accessible can increase the efficiency of the accelerator 502. For example, values can be simultaneously read and provided to each row of the processing engine array 510, so that the entire processing engine array 510 can be in use in one clock cycle. As another example, the memory banks 514 can be read at the same time that results computed by the processing engine array 510 are written to the memory subsystem 504. In contrast, a single memory may be able to service only one read or write at a time. With a single memory, multiple clock cycles can be required, for example, to read input data for each row of the processing engine array 510 before the processing engine array 510 can be started.

In various implementations, the memory subsystem 504 can be configured to simultaneously service multiple clients, including the processing engine array 510, the activation engine 516, the pooling engine 518, and any external clients that access the memory subsystem 504 over a communication fabric 520. In some implementations, being able to service multiple clients can mean that the memory subsystem 504 has at least as many memory banks as there are clients. In some cases, each row of the processing engine array 510 can count as a separate client. In some cases, each column of the processing engine array 510 can output a result, such that each column can count as a separate write client. In some cases, output from the processing engine array 510 can be written into the memory banks 514 that can then subsequently provide input data for the processing engine array 510. As another example, the activation engine 516 and the pooling engine 518 can include multiple execution channels, each of which can be separate memory clients. The memory banks 514 can be implemented, for example, using static random access memory (SRAM).

In various implementations, the memory subsystem 504 can include control logic. The control logic can, for example, keep track of the address spaces of each of the memory banks 514, identify memory banks 514 to read from or write to, and/or move data between the memory banks 514. In some implementations, memory banks 514 can be hardwired to particular clients. For example, a set of memory banks 514 can be hardwired to provide values to the rows of the processing engine array 510, with one memory bank servicing each row. As another example, a set of memory banks can be hired wired to receive values from columns of the processing engine array 510, with one memory bank receiving data for each column.

The processing engine array 510 is the computation matrix of the example accelerator 502. The processing engine array 510 can, for example, execute parallel integration, convolution, correlation, and/or matrix multiplication, among other things. The processing engine array 510 includes multiple processing engines 511, arranged in rows and columns, such that results output by one processing engine 511 can be input directly into another processing engine 511. Processing engines 511 that are not on the outside edges of the processing engine array 510 thus can receive data to operate on from other processing engines 511, rather than from the memory subsystem 504.

In various examples, the processing engine array 510 uses systolic execution, in which data arrives at each processing engine 511 from different directions at regular intervals. In some examples, input data can flow into the processing engine array 510 from the left and weight values can be loaded at the top. In some examples weights and input data can flow from the left and partial sums can flow from top to bottom. In these and other examples, a multiply-and-accumulate operation moves through the processing engine array 510 as a diagonal wave front, with data moving to the right and down across the array. Control signals can be input at the left at the same time as weights, and can flow across and down along with the computation.

In various implementations, the number of columns in the processing engine array 510 determines the computational capacity of the processing engine array 510, and the number of rows determines the required memory bandwidth for achieving maximum utilization of the processing engine array 510. The processing engine array 510 can have, for example, 64 columns and 428 rows, or some other number of columns and rows.

An example of a processing engine 511 is illustrated in FIG. 5 in an inset diagram. As illustrated by this example, a processing engine 511 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 511.

In the illustrated example, an input from above can include a partial sum, p_in, provided either from another processing engine 511 or from a previous round of computation by the processing engine array 510. When starting a computation for a new set of input data, the top row of the processing engine array 510 can receive a fixed value for p_in, such as zero. As illustrated by this example, i and w are multiplied together and the result is summed with p_in to produce a new partial sum, p_out, which can be input into another processing engine 511. Various other implementations of the processing engine 511 are possible.

Outputs from the last row in the processing engine array 510 can be temporarily stored in the results buffer 512. The results can be intermediate results, which can be written to the memory banks 514 to be provided to the processing engine array 510 for additional computation. Alternatively, the results can be final results, which, once written to the memory banks 514 can be read from the memory subsystem 504 over the communication fabric 520, to be output by the system.

In some implementations, the accelerator 502 includes an activation engine 516. In these implementations, the activation engine 516 can combine the results from the processing engine array 510 into one or more output activations. For example, for a convolutional neural network, convolutions from multiple channels can be summed to produce an output activation for a single channel. In other examples, accumulating results from one or more columns in the processing engine array 510 may be needed to produce an output activation for a single node in the neural network. In some examples, activation engine 516 can be bypassed.

In various examples, the activation engine 516 can include multiple separate execution channels. In these examples, the execution channels can correspond to the columns of the processing engine array 510, and can perform an operation on the outputs of a column, the result of which can be stored in the memory subsystem 504. In these examples, the activation engine 516 may be able to perform between 1 and n parallel computations, where n is equal to the number of columns in the processing engine array 510. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 502 can include a pooling engine 518. Pooling is the combining of outputs of the columns of the processing engine array 510. Combining can include for example, computing a maximum value, a minimum value, an average value, a median value, a summation, a multiplication, or another logical or mathematical combination. In various examples, the pooling engine 518 can include multiple execution channels that can operating on values from corresponding columns of the processing engine array 510. In these examples, the pooling engine 518 may be able to perform between 1 and n parallel computations, where n is equal to the number of columns in the processing engine array 510. In various examples, execution channels of the pooling engine 518 can operate in parallel and/or simultaneously. In some examples, the pooling engine 518 can be bypassed.

Herein, the activation engine 516 and the pooling engine 518 may be referred to collectively as execution engines. The processing engine array 510 is another example of an execution engine. Another example of an execution engine is a Direct Memory Access (DMA) engine, which may be located outside the accelerator 502.

Input data 550 can arrive over the communication fabric 520. The communication fabric 520 can connect the accelerator 502 to other components of a processor, such as a DMA engine that can obtain input data 550 from an Input/Output (I/O) device, a storage drive, or a network interface. The input data 550 can be, for example one-dimensional data, such as a character string or numerical sequence, or two-dimensional data, such as an array of pixel values for an image or frequency and amplitude values over time for an audio signal. In some examples, the input data 550 can be three-dimensional, as may be the case with, for example, the situational information used by a self-driving car or virtual reality data. In some implementations, the memory subsystem 504 can include a separate buffer for the input data 550. In some implementations, the input data 550 can be stored in the memory banks 514 when the accelerator 502 receives the input data 550.

In some examples, the accelerator 502 can implement a neural network processing engine. In these examples, the accelerator 502, for a set of input data 550, can execute a neural network to perform a task for which the neural network was trained. Executing a neural network on a set of input data can be referred to as inference or performing inference.

The weights for the neural network can be stored in the memory subsystem 504, along with input data 550 on which the neural network will operate. The neural network can also include instructions, which can program the processing engine array 510 to perform various computations on the weights and the input data. The instructions can also be stored in the memory subsystem 504, in the memory banks 514 or in a separate instruction buffer. The processing engine array 510 can output intermediate results, which represent the outputs of individual layers of the neural network. In some cases, the activation engine 516 and/or pooling engine 518 may be enabled for computations called for by certain layers of the neural network. The accelerator 502 can store the intermediate results in the memory subsystem 504 for inputting into the processing engine array 510 to compute results for the next layer of the neural network. The processing engine array 510 can further output final results from a last layer of the neural network. The final results can be stored in the memory subsystem 504 and then be copied out to host processor memory or to another location.

Figure 6:
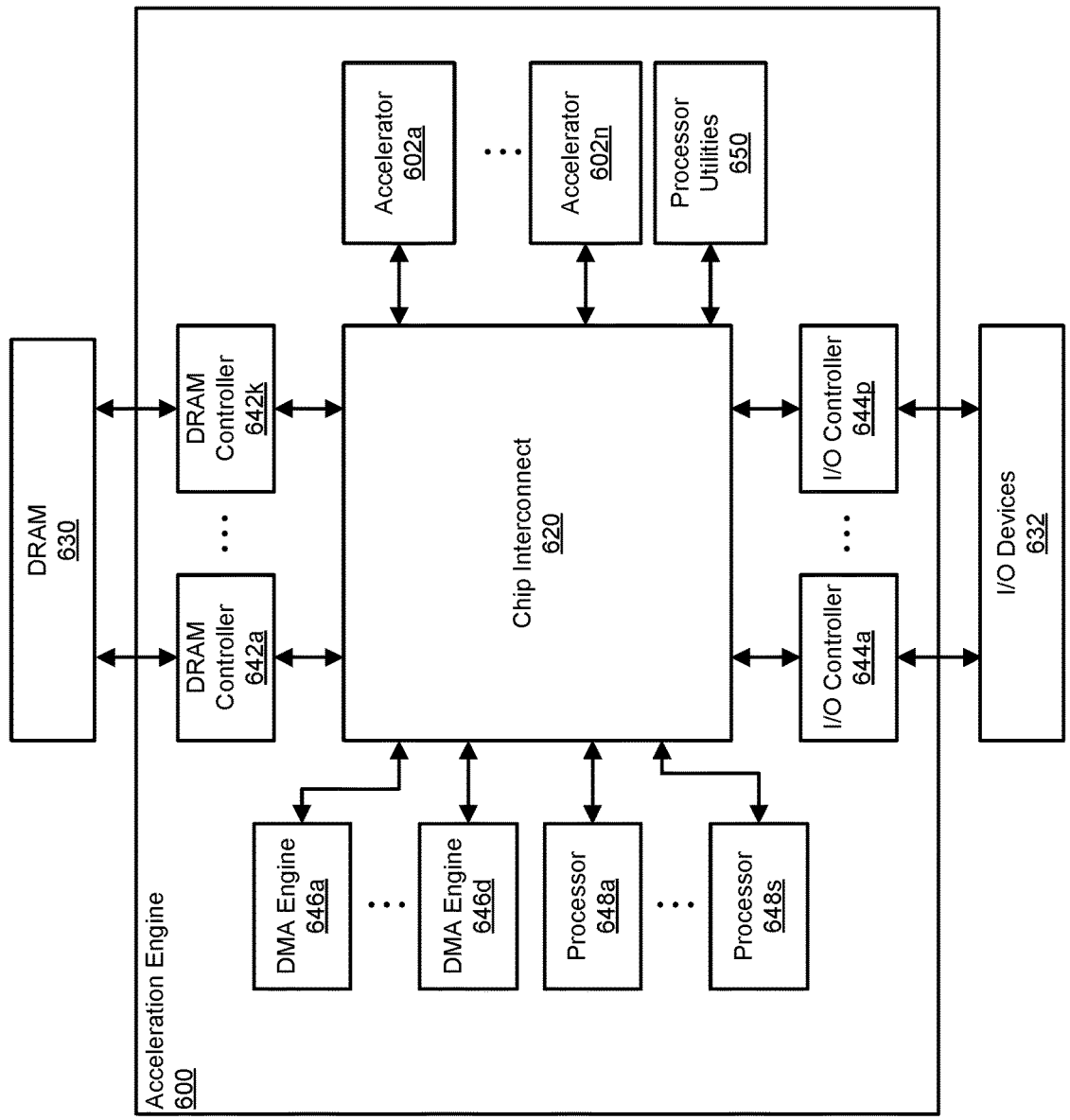
FIG. 6 includes a block diagram that illustrates an example of an acceleration engine.

FIG. 6 includes a block diagram that illustrates an example of an acceleration engine 600. The acceleration engine 600 is an example of an integrated circuit that can include one or more accelerators 602a-602n that may be similar to the accelerator illustrated in FIG. 5.

In the example of FIG. 6, the acceleration engine 600 includes multiple accelerators 602a-602n, each of which can perform a set of operations. In various examples, the accelerators 602a-602n for particular types of operations, so that the accelerators 602a-602n can perform the operations much faster than when similar operations are performed by a general purpose processor. In various examples, to perform a set of operations, input data on which the operations are to be performed must first be moved into the accelerators 602a-602n. Additionally, in some cases, program code is also moved into the accelerators 602a-602n, which programs the operations that the accelerators 602a-602n will perform on the data. In the illustrated example, the acceleration engine 600 includes n accelerators 602a-602n. Examples of accelerators that can be included in the acceleration engine 600 include graphics accelerators, floating point accelerators, neural network accelerators, and others. In various examples, the accelerators 602a-602n can each be the same (e.g., each of the is a graphics accelerator) or can be different (e.g., the accelerators 602a-602n include a graphics accelerator, a floating point accelerator, and neural network accelerator).

The example acceleration engine 600 further includes DRAM controllers 642a-642k for communicating with an external memory. The external memory is implemented, in this example, using DRAM 630. In the illustrated example, the acceleration engine 600 includes k DRAM controllers 642a-642k, each of which may be able to communicate with an independent set of banks of DRAM. In other examples, other types of RAM technology can be used for the external memory. The DRAM controllers 642a-642k can also be referred to as memory controllers.

In various examples, input data and/or program code for the accelerators 602a-602n can be stored in the DRAM 630. Different programs can cause the accelerators 602a-602n to perform different operations. For example, when one of the accelerators is a neural network accelerator, one program can configure the neural network accelerator to perform speech recognition while another program can configure the neural network accelerator to perform image recognition. In various examples, different accelerators 602a-602n can be programmed with different programs, so that each performs a different set of operations. In various examples, the processors 648a-648s can manage moving of program code from the DRAM 630 to the accelerators 602a-602n.

The example acceleration engine 600 further includes I/O controllers 644a-644p for communicating with I/O devices 632 in the system. The acceleration engine 600 can communicate with I/O devices over, for example, a processor bus. In some examples, the processor bus can be implemented using Peripheral Component Interconnect (PCI)

and/or a variation of the PCI bus protocol. The processor bus can connect the acceleration engine 600 to I/O devices such as, for example, input and output devices, memory controllers, storage devices, and/or network interface cards, among other things. In some examples, the I/O controllers 644-644p can enable the acceleration engine 600 to act as an I/O device for a host processor. For example, the acceleration engine 600 can be the recipient of input data from the host processor, and a command indicating an operation to be performed on the input data (e.g., a particular computation or analysis). In the illustrated example, the acceleration engine 600 includes p I/O controllers 644a-644p, each of which may include a separate root complex and may communicate with a separate set of I/O devices 632. In other examples, other standardized bus protocols, such as Ultra Path Interconnect (UPI) can be used for the host bus. In other examples, a proprietary bus protocol can be used.

Movement of data in the acceleration engine 600 can be managed by one or more processors 648a-648s, which can also be referred to as data management processors. In the example of FIG. 6, the acceleration engine 600 includes s processors 648a-648s incorporated into (e.g., on the same silicon die) the device. In other examples, the processors 648a-648s can be external to the acceleration engine 600 (e.g., on a different die and/or in a different package). In some examples, the processors 648a-648s can manage the movement of data from I/O devices 632 to the accelerators 602a-602n or the DRAM 630. For example, input data may be located at an I/O device 632 or in processor memory, and the processors 648a-648s can move the input from the I/O device 632 or processor memory into an accelerator or into DRAM 630. As another example, program code for the accelerators 602a-602n may be located on an I/O device 632 or in processor memory.

The example acceleration engine 600 further includes DMA engines 646a-646d that can move data between the accelerators 602a-602n, DRAM controllers 642a-642k, and I/O controllers 644a-644p. In the illustrated example, the acceleration engine 600 includes d DMA engines 646a-646d. In some implementations, the DMA engines 646a-646d can be assigned to specific tasks, such as moving data from the DRAM controllers 642a-642d to the accelerators 602a-602n, or moving data between the I/O controllers 644a-644p and the accelerators 602a-602n. These tasks can be assigned, for example, by enqueueing descriptors with the DMA engines 646a-646d, where a descriptor identifies an address for a block of data and an operation (e.g., a read or a write) to perform. A descriptor, for example, can direct a DMA engine to instruct a DMA controller to read a block of data from DRAM 630. A descriptor can, as a further example, instruct the DMA engine to write data, read by the DMA controller, to an accelerator. Further descriptors can be used to move data from an accelerator to DRAM 630.

One or more processor utilities blocks 650 may generate notifications for the various execution engines of the acceleration engine 600. In various examples, the processor utilities blocks 650 may generate notifications when event registers are set or cleared. Notifications for different event registers can be written to the same notification queue in processor memory or in different notification queues in processor memory. The processor utilities blocks 650 may connect to the other components in the acceleration engine 600, for example, the DMA engines 646a-646d, accelerators 602a-602n, etc., through the chip interconnect 620.

In various examples, each of the processors 648a-648s can be responsible for managing the data movement for a different accelerator. In some examples, a processor may manage the data movement for more than one accelerator. Similarly, in various examples, each of the processors 648a-648s can be assigned to one or more DMA engines 646a-646d. In these and other examples, associations between processors 648a-648s, accelerators 602a-602n, and DMA engines 646a-646d is determined by program code being executed by each respective processor.

In the example acceleration engine 600, the various components can communicate over a chip interconnect 620. The chip interconnect 620 primarily includes wiring for routing data between the components of the acceleration engine 600. In some cases, the chip interconnect 620 can include a minimal amount of logic, such as multiplexors to control the direction of data, flip-flops for handling clock domain crossings, and timing logic.

Figure 7:
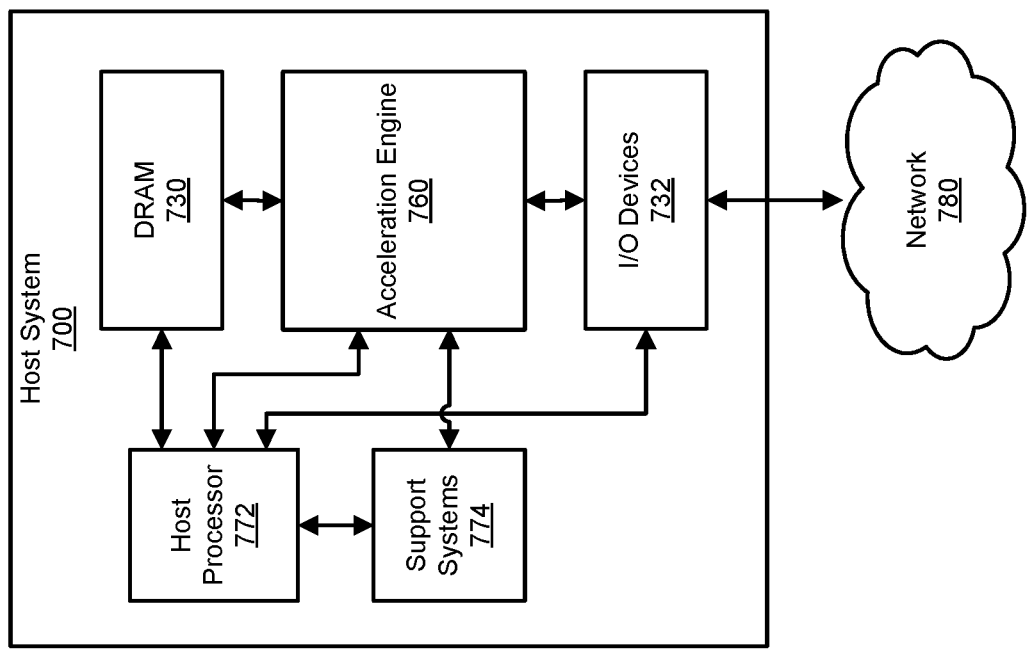
FIG. 7 includes a block diagram that illustrates an example of a host system.

FIG. 7 includes a block diagram that illustrates an example of a host system 700 in which an acceleration engine 760 can be used. The acceleration engine 760 of FIG. 7 is an example of a device that can include one or more accelerator engines such as is illustrated in FIG. 6. The example host system 700 of FIG. 7 includes the acceleration engine 760, a host processor 772, DRAM 730 or processor memory, I/O devices 732, and support systems 774. In various implementations, the host system 700 can include other hardware that is not illustrated here.

The host processor 772 is a general purpose integrated circuit that is capable of executing program instructions. In some examples, the host processor 772 can include multiple processing cores. A multi-core processor may include multiple processing units within the same processor In some examples, the host system 700 can include more than one host processor 772. In some examples, the host processor 772 and the acceleration engine 760 can be one chip, such as, one or more integrated circuits within the same package.

In various examples, the host processor 772 can communicate with other components in the host system 700 over one or more communication channels. For the example, the host system 700 can include a host processor bus, which the host processor 772 can use to communicate with the DRAM 730, for example. As another example, the host system 700 can include an I/O bus, such as a PCI-based bus, over which the host processor 772 can communicate with the acceleration engine 760 and/or the I/O devices 732, for example. In various examples, the host system 700 can, alternatively or additionally, include other communication channels or busses, such as serial busses, power management busses, storage device busses, and so on.

In some examples, software programs executing on the host processor 772 can receive or generate input for processing by the acceleration engine 760. In some examples, the programs can select an appropriate neural network to execute for a given input. For example, a program may be for language translation, and can select one or more neural networks capable of speech recognition and/or machine translation. In these and other examples, the programs can configure the acceleration engine 760 with the neural network to execute, and/or can select a neural network processing engine on the acceleration engine 760 that has previously been configured to execute the desired neural network. In some examples, once the acceleration engine 760 has started inference on input data, the host processor 772 can manage the movement of data (such as weights, instructions, intermediate results, results of conditional layers, and/or final results) into or out of the acceleration engine 760.

In some examples, a software program that is using the acceleration engine 760 to conduct inference can read the result from a conditional layer from the acceleration engine 760 and/or from a storage location, such as in DRAM 730. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinate by software.

The DRAM 730 is memory that is used by the host processor 772 for storage of program code that the host processor 772 is in the process of executing, as well as values that are being operated on. In some examples, the data for a neural network (e.g., weight values, instructions, and other data) can be all or partially stored in the DRAM 730. DRAM is a common term for processor memory, and though DRAM is volatile memory, processor memory can be volatile and/or non-volatile. Though not illustrated here, the host system 700 can include other volatile and non-volatile memories for other purposes. For example, the host system 700 can include a Read-Only Memory (ROM) that stores boot code for booting the host system 700 at power on, and/or Basic Input/Output System (BIOS) code.

Though not illustrated here, the DRAM 730 can store instructions for various programs, which can be loaded into and be executed by the host processor 772. For example, the DRAM 730 can be storing instructions for an operating system, one or more data stores, one or more application programs, one or more drivers, and/or services for implementing the features disclosed herein.

The operating system can manage and orchestrate the overall operation of the host system 700, such as scheduling tasks, executing applications, and/or controller peripheral devices, among other operations. In some examples, a host system 700 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 700. For example, some drivers can provide communication between the operating system and peripheral devices or I/O devices 732. Alternatively or additionally, some drivers may provide communication between application programs and the operating system, and/or application programs and peripheral devices accessible to the host system 700. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 732 can include hardware for connecting to user input and output devices, such as keyboards, mice, pens, tablets, voice input devices, touch input devices, displays or monitors, speakers, and printers, among other devices The I/O devices 732 can also include storage drives and/or network interfaces for connecting to a network 780. For example, the host system 700 can use a network interface to communicate with storage devices, user terminals, other computing devices or servers, and/or other networks, among various examples.

In various examples, one or more of the I/O devices 732 can be storage devices. In these examples, the storage device include non-volatile memory and can store program instructions and/or data. Examples of storage devices include magnetic storage, optical disks, solid state disks, flash memory, and/or tape storage, among others. The storage device can be housed in the same chassis as the host system 700 or may be in an external enclosure. A storage device can be fixed (e.g., attached by screws) or removable (e.g., having a physical release mechanism and possibly a hot-plug mechanism).

Storage devices, the DRAM 730, and any other memory component in the host system 700 are examples of computer-readable storage media. Computer-readable storage media are physical mediums that are capable of storing data in a format that can be read by a device such as the host processor 772. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. as used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 732 can be PCI-based devices. In these examples, a PCI-based I/O device includes a PCI interface for communicating with the host system 700. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device.

Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 774 can include hardware for coordinating the operations of the acceleration engine 760. For example, the support systems 774 can include a microprocessor that coordinates the activities of the acceleration engine 760, including moving data around on the acceleration engine 760. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have much more limited capabilities than the host processor 772. In some examples, the program executed by the microprocessor is stored on the hardware of microprocessor, or on a non-volatile memory chip in the host system 700. In some examples, the microprocessor and the acceleration engine 760 can be on chip, such as one integrated circuit on the same die and in the same package.

In some examples, the support systems 774 can be responsible for taking instructions from the host processor 772 when programs executing on the host processor 772 request the execution of a neural network. For example, the host processor 772 can provide the support systems 774 with a set of input data and a task that is to be performed on the set of input data. In this example, the support systems 774 can identify a neural network that can perform the task, and can program the acceleration engine 760 to execute the neural network on the set of input data. In some examples, the support systems 774 only needs to select an appropriate neural network processing engine of the neural network processor. In some examples, the support systems 774 may need to load the data for the neural network onto the acceleration engine 760 before the acceleration engine 760 can start executing the neural network. In these and other examples, the support systems 774 can further receive the output of executing the neural network, and provide the output back to the host processor 772.

In some examples, the operations of the support systems 774 can be handled by the host processor 772. In these examples, the support systems 774 may not be needed and can be omitted from the host system 700.

In various examples, the host system 700 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 700 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

Figure 8:
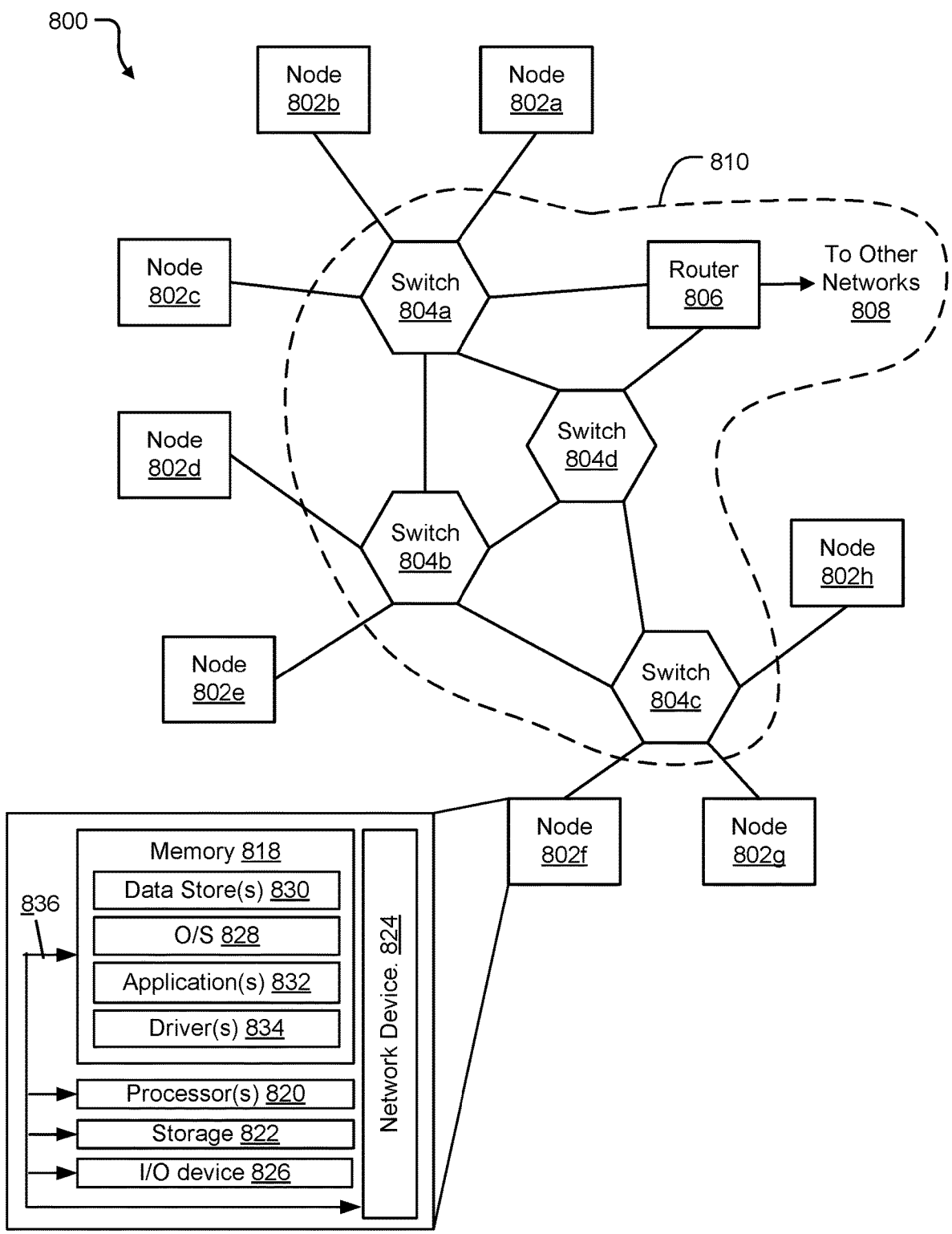
FIG. 8 includes a diagram of an example network.

FIG. 8 includes a diagram of an example network 800, which can include one or more host systems, such as the host system illustrated in FIG. 7. For example, the example network 800 of FIG. 8 includes multiple nodes 802a-802h, one or more of which can be a host system such as is illustrated in FIG. 7. Others of the nodes 802a-802h can be other computing devices, each of which include at least a memory for storing program instructions, a processor for executing the instructions, and a network interface for connecting to the network 800.

In various examples, the network 800 can be used to process data. For example, input data can be received at one of the nodes 802a-802h or from other networks 808 with which the network 800 can communicate. In this example, the input data can be directed to a node in the network 800 that includes an acceleration engine, for the acceleration engine to operate on and produce a result. The result can then be transferred to the node or other network from which the input data was received. In various examples, input data can be accumulated from various sources, including one or more of the nodes 802a-802h and/or computing devices located in the other networks 808, and the accumulated input data can be directed to one or more host systems in the network 800. Results from the host systems can then be distributed back to the sources from which the input data was gathered.

In various examples, one or more of the nodes 802a-802h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 8, the nodes 802a-802h are connected to one another using a switched architecture with point-to point links. The switched architecture includes multiple switches 804a-804d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 804a-804d of FIG. 8 may be connected to the nodes 802a-802h and provide multiple paths between any two nodes.

The network 800 may also include one or more network devices for connection with other networks 808, such as a router 806. Routers use headers and forwarding tables to determine the best path for forwarding the packets, and use protocols such as internet control message protocol (ICMP) to communicate with each other and configure the best route between any two devices. The router 806 of FIG. 8 can be used to connect to other networks 808 such as subnets, LANs, wide area networks (WANs), and/or the Internet.

In some examples, network 800 may include any one or a combination of many different types of networks, such as cable networks, the Internet, wireless networks, cellular networks and other private and/or public networks. The interconnected switches 804a-804d and the router 806, if present, may be referred to as a switch fabric 810, a fabric, a network fabric, or simply a network. In the context of a computer network, terms "fabric" and "network" may be used interchangeably herein.

The nodes 802a-802h may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for generating tracing information for execution engines of an integrated circuit device, the method comprising:

executing, by an execution engine, a first set of instructions from a first instruction queue, the first set of instructions including:

writing, with a first instruction generated by a processor of a host system executing a driver program, a first value to an event register associated with the first instruction queue, wherein upon writing the first value, notification logic generates a first notification that the first value was written to the event register associated with the first instruction queue, the first notification comprising a first timestamp and an identifier for the first instruction;

performing a first data movement operation by a second instruction generated by the processor of the host system executing a compiler; and writing, with a third instruction generated by the processor of the host system executing the driver program, a second value to the event register associated with the first instruction queue, the third instruction being a last instruction in the first set of instructions, wherein upon writing the second value, the notification logic generates a second notification that the second value was written to the event register associated with the first instruction queue, the second notification comprising a second timestamp and an identifier for the third instruction.

2. The method of claim 1, further comprising:

executing, by the execution engine, a second set of instructions from the first instruction queue, the second set of instructions including:

a fourth instruction generated by the processor of the host system executing the driver program to write a third value to the event register associated with the first instruction queue, wherein upon writing the third value the notification logic generates a third notification, the third notification comprising a third timestamp and an identifier for the fourth instruction;

a fifth instruction generated by the processor executing the compiler to perform a second data movement operation; and a sixth instruction generated by the processor of the host system executing the driver program to write a fourth value to the event register associated with the first instruction queue, wherein upon writing the fourth value the notification logic generates a fourth notification, the fourth notification comprising a fourth timestamp and an identifier for the sixth instruction.

3. A computer implemented method, comprising:

generating a set of instructions including:

an instruction inserted as a first instruction in the set of instructions to write a first value to a specified register;

a set of second instructions, the set of second instructions comprising memory instructions;

a third instruction to write a second value to the specified register inserted as a last instruction in the set of instructions; and upon executing the set of instructions from a first instruction queue of a plurality of instruction queues:

executing the first instruction to write the first value to the specified register, the specified register being associated with the first instruction queue;

generating a first notification that the first value was written to the specified register, the first notification including a first timestamp;

executing the set of second instructions;

executing the third instruction to write the second value to the specified register; and generating a second notification that the second value was written to the specified register, the second notification including a second timestamp.

4. The computer implemented method of claim 3, wherein the specified register is an event register; and the first instruction in the set of instructions is a set event instruction and the third instruction in the set of instructions is a clear event instruction.

5. The computer implemented method of claim 4, wherein:

each instruction queue of the plurality of instruction queues is associated with a different one of a plurality of event registers;

other sets of instructions are executed from each of the plurality of instruction queues;

a first instruction in each of the other sets of instructions executed from each of the plurality of instruction queues is a set event instruction and a last instruction in each of the other sets of instructions executed from each of the plurality of instruction queues is a clear event instruction; and notifications are generated for the set event instruction and the clear event instruction executed from each of the plurality of instruction queues when values are written by the set event and clear event instructions to the one of the plurality of event registers associated with each of the plurality of instruction queues.

6. The computer implemented method of claim 5, wherein the notifications are written to a set of notification queues configured in a host or a processor memory, each notification queue in the set of notification queues associated with one of the plurality of instruction queues.

7. The computer implemented method of claim 5, wherein:

the notifications from each of the plurality of instruction queues are written to one notification queue configured in a host or a processor memory.

8. The computer implemented method of claim 3, wherein the specified register is a notification register;

each instruction queue of the plurality of instruction queues is associated with the notification register;

other sets of instructions are executed from each of the plurality of instruction queues;

a first instruction in each of the other sets of instructions executed from each of the plurality of instruction queues is a first write instruction to the notification register and a last instruction in each of the other sets of instructions executed from each of the plurality of instruction queues is a second write instruction to the notification register; and a notification is generated for each write instruction to the notification register executed from each of the plurality of instruction queues.

9. The computer implemented method of claim 8, wherein each write instruction to the notification register includes information identifying the one of the plurality of instruction queues executing the write instructions; and the notification generated by the write instruction includes the information identifying the one of the plurality of instruction queues executing the write instructions.

10. The computer implemented method of claim 8, wherein notifications are written to a notification queue configured in a host or a processor memory, each instruction queue of the plurality of instruction queues associated with the notification queue.

11. The computer implemented method of claim 3, wherein each of the plurality of instruction queues is associated with one execution engine.

12. The computer implemented method of claim 3, wherein each of the plurality of instruction queues is associated with different execution engines.

13. The computer implemented method of claim 3, wherein the set of second instructions is generated by a compiler at compile time.

14. The computer implemented method of claim 3, wherein the first instruction, the set of second instructions, and the third instruction are generated by a compiler at compile time.

15. A computing system, comprising:
a processor;
notification logic;
a processor memory communicatively coupled to the processor, the processor memory configured to store instructions implementing a program to configure instruction queues in the processor memory to store sets of instructions;
a set of registers; and
execution engines operable to execute the sets of instructions, each of the sets of instructions including:
a first instruction to write a first value to one register of the set of registers, wherein writing the first value causes the notification logic to generate a first notification, the first notification comprising a first timestamp and an identifier for the first instruction;
a second instruction to perform a first data movement operation; and
a third instruction to write a second value to the one register of the set of registers, wherein writing the second value causes the notification logic to generate a second notification, the second notification comprising a second timestamp and an identifier for the third instruction.

16. The computing system of claim 15, wherein the second instruction is generated by the processor executing a compiler, and
the first and third instructions are inserted by a driver program.

17. The computing system of claim 15, wherein each register in the set of registers is associated with one of the instruction queues.

18. The computing system of claim 15, wherein the program implemented by the processor further configures notification queues in the processor memory, each of the notification queues associated with one instruction queue of the instruction queues.

19. The computing system of claim 18, wherein the notification logic writes notifications to a notification queue of the notification queues associated with the one instruction queue of the instruction queues that causes the notifications to be generated.

20. The computing system of claim 15, wherein one of the execution engines is a direct memory access (DMA) engine.

21. A non-transitory computer readable storage medium having stored therein instructions that, when executed by one or more processors cause the one or more processors to execute a compiler, the compiler performing operations including:
generating a first instruction in a set of instructions, wherein the first instruction when executed causes a first notification to be generated to a notification queue configured in a host or processor memory, the first notification including a first timestamp indicating when the first notification was generated and an identifier for the first instruction;
generating a second instruction in the set of instructions, wherein the second instruction when executed causes a first data movement operation to be performed; and
generating a third instruction, the third instruction being a last instruction in the set of instructions, wherein the last instruction when executed causes a second notification to be generated to the notification queue configured in the host or processor memory, the second notification including a second timestamp indicating when the second notification was generated and an identifier for the last instruction.

22. A non-transitory computer readable storage medium having stored therein instructions that, when executed by one or more processors cause the one or more processors to execute a driver program, the driver program performing operations including:
generating a first instruction;
inserting the first instruction as a first instruction in a set of instructions, wherein the first instruction when executed causes a first notification to be generated to a notification queue configured in a host or processor memory, wherein the first notification includes a first timestamp indicating when the first notification was generated and an identifier for the first instruction;
generating a second instruction; and
inserting the second instruction as a last instruction in the set of instructions, wherein the second instruction when executed causes a second notification to be generated to the notification queue configured in the host or processor memory, the second notification including a second timestamp indicating when the second notification was generated and an identifier for the last instruction.

* * * * *